Figure 1:
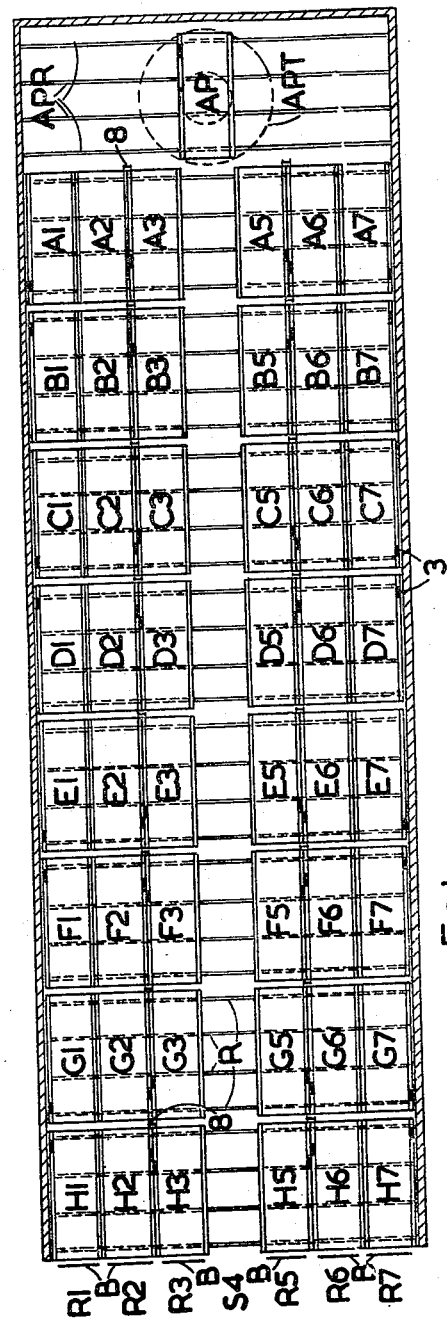

Aug. 5, 1952     K. R. MEDWAY     2,605,911
PARKING ARRANGEMENT WITH MOVABLE VEHICLE CARRYING PLATFORMS
Filed Dec. 29, 1947     4 Sheets—Sheet 1

Inventor:
Kenneth R. Medway,
By his attorneys:
Baldwin, Wight, & Prevost

Aug. 5, 1952   K. R. MEDWAY   2,605,911
PARKING ARRANGEMENT WITH MOVABLE VEHICLE CARRYING PLATFORMS
Filed Dec. 29, 1947   4 Sheets-Sheet 2

Inventor:
Kenneth R. Medway,
By his attorneys:
Baldwin, Wight, & Prevost

Patented Aug. 5, 1952

2,605,911

UNITED STATES PATENT OFFICE 2,605,911

PARKING ARRANGEMENT WITH MOVABLE VEHICLE CARRYING PLATFORMS

Kenneth Ronald Medway, Worcester Park, England

Application December 29, 1947, Serial No. 794,394
In Great Britain December 1, 1947

1 Claim. (Cl. 214—16.1)

This invention relates to parking arrangements for garages, parking places and the like for automobiles, lorries and other vehicles.

The main object of the invention is to provide improved parking arrangements for garages, parking places and the like whereby a high percentage of the available superficial area of the garage or parking place shall be efficiently utilisable for parking vehicles and which shall be such that, despite such utilisation, access to any unoccupied space may be quickly obtained for a vehicle desired to be parked there while easy egress from any occupied space may be quickly obtained for a parked vehicle desired to be removed. The invention further seeks to attain these desirable objects by means of relatively simple and inexpensive mechanism which shall be easy to operate, readily installed in existing garages and parking places, and composed of parts which can be standardised to allow of the ready application of the invention to garages and parking places of widely different sizes and shapes.

The earning capacity of a garage or parking place obviously depends upon the number of vehicles it can accommodate and there is, therefore, great advantage accruing from so arranging vehicles that as large a proportion as possible of the available superficial area may be occupied thereby. On the other hand it is impossible in practice, to arrange in advance the order in which parked vehicles will leave and if, therefore, there is not to be undue delay in removing vehicles or parking further vehicles (due to the need for moving vehicles in the way), it is necessary in any garage or parking place in which vehicles are driven to and from their packing spaces entirely under their own power, so to arrange all the spaces that there is always free access to each space irrespective of whether the others are occupied or not. Since the turning circle of a normal vehicle is of relatively large radius this involves that a considerable proportion of the total superficial area is not available for parking and although the amount of wasted space can be reduced somewhat by the provision of one or more suitably positioned turntables, nevertheless in known arrangements of this kind the proportion of wasted space still remains undesirably high. Moreover, with many known arrangements an undesirably high degree of skill is required of drivers if they are to park their vehicles closely so as to occupy space efficiently. In addition many vehicle owners desire to leave their vehicles closed and locked when parked and this clearly cannot be permitted in any garage or parking place in which it may become necessary to move a vehicle in the absence of the owner in order to allow another vehicle to park or to be driven off.

The present invention avoids the defects of known parking arrangements and enables the practical requirements of highly efficient space utilisation, quick entry or removal of vehicles, easy driving, and freedom of leaving vehicles locked, to be satisfied.

According to this invention a parking arrangement for a garage, parking place or the like comprises a plurality of adjacent parallel rows of movable platforms each adapted to carry a vehicle and each independently movable sideways out of its row by a distance approximately equal to the width of that row, there being left either to one side of said plurality of rows or between any two of said rows, a longitudinal space approximately equal in length to the lengths of a row and approximately equal in width to the width of a row, and means for moving any selected combination of said platforms sideways by said distance towards said space and back again.

Where considerations of site allow it is preferred to provide for entry to the garage or parking place at one end of all the rows and for exit at the other end. Where, however, this is not possible and entry and exit must be made at the same end it is preferred, though not essential, to provide at the end of the rows remote from the entry point, an additional platform which is fitted with a turntable and which can be moved to come opposite the end of any row or of the longitudinal space.

Preferably each platform in the rows is fitted with its own electric motor for driving it sideways and selection of the platform to be moved at any time is effected under the control of controller means which prepare for energisation the circuits of the motors of the platforms to be moved.

Preferably also the sideways movement of each platform in the rows is limited by limit switches arranged to be operated by the platform itself when it has moved the required distance.

Preferably each platform in the rows is separately designated and selection of the platforms to be moved at any time is effected by a controller which serves both for parking and for egress, and has a correspondingly designated position for each platform designation whereby, when the parking controller is moved to a particular position, the platforms selected for movement are those which, when moved, will give access to the correspondingly designated platform and egress from the correspondingly designated platform. Thus, if it is desired to park in or unpark from a platform in a row the controller is moved to the position having the same designation as that platform, whereupon all platforms which it is necessary to move to give free access to or egress from said platform are moved sideways. Of course, where the paths to and from any platform are the same only one controller is required but in most practical cases they will not be the same, it being generally (though not necessarily) preferred that a vehicle shall reach a platform in one row by driving down that row from one end and leave it by continuing down the row in the same direction. In this way all need for driving a vehicle backwards is avoided.

Preferably movable obstructions are placed at least at the ends of the rows adjacent the points of entry and/or exit of the garage or parking place as a whole and these obstructions are arranged to operate safety switches or the like to prevent energization of the means for moving the platforms with respect to their rows except when the obstructions are in place. The purpose of this is to reduce risk of the platforms being moved while a vehicle is being driven down a row. For a similar safety reason a warning lamp is preferably provided and arranged to be lit automatically whenever the platform moving means are energised.

The platforms are low platforms at or near floor level so that vehicles can readily drive on to them. For reasons of constructional cheapness it is preferred to have them a little above floor level with wheels running on rails or in grooves in the floor, said rails or grooves of course extending at right angles to the direction of length of the rows. In such a case where, for constructional reasons—e. g. because of the presence of roof supporting pillars—it is not possible to have each platform almost touching its neighbours in the same row, each platform is preferably provided with a spring ramp, adapted to be forced down by the weight of a vehicle, at each of its ends so that a vehicle can drive from platform to platform without having to go up and down a series of steps.

Figure 2:
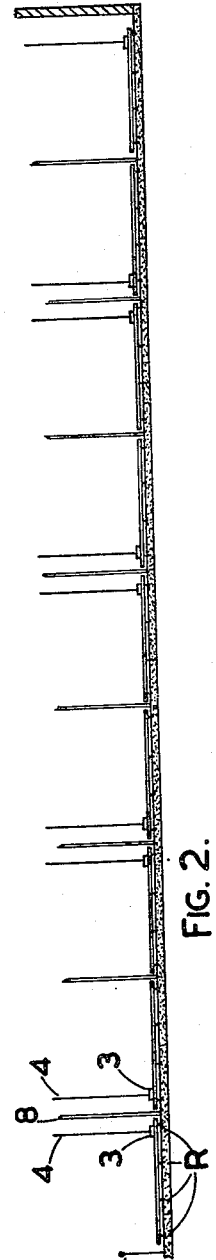
Figure 3:
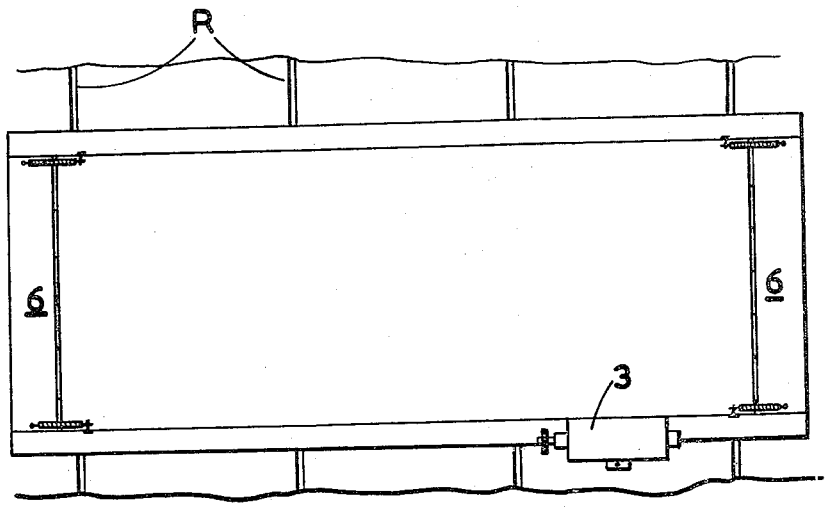
Figure 4:
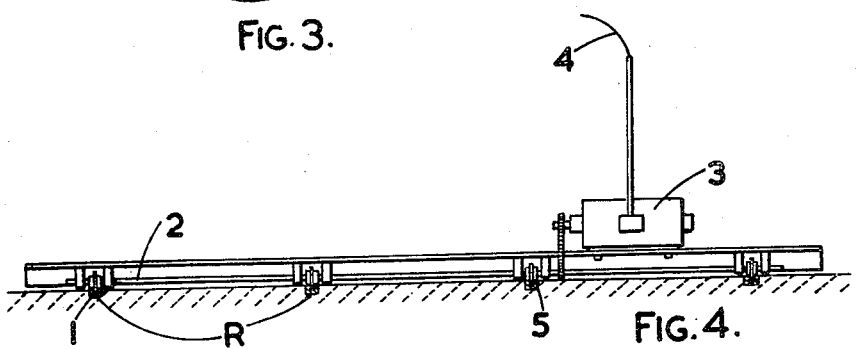
Figure 5:
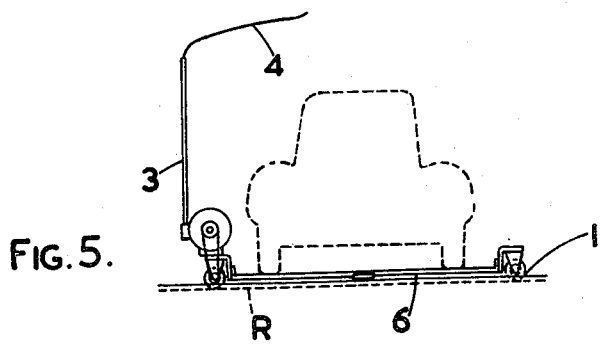
Figure 6:
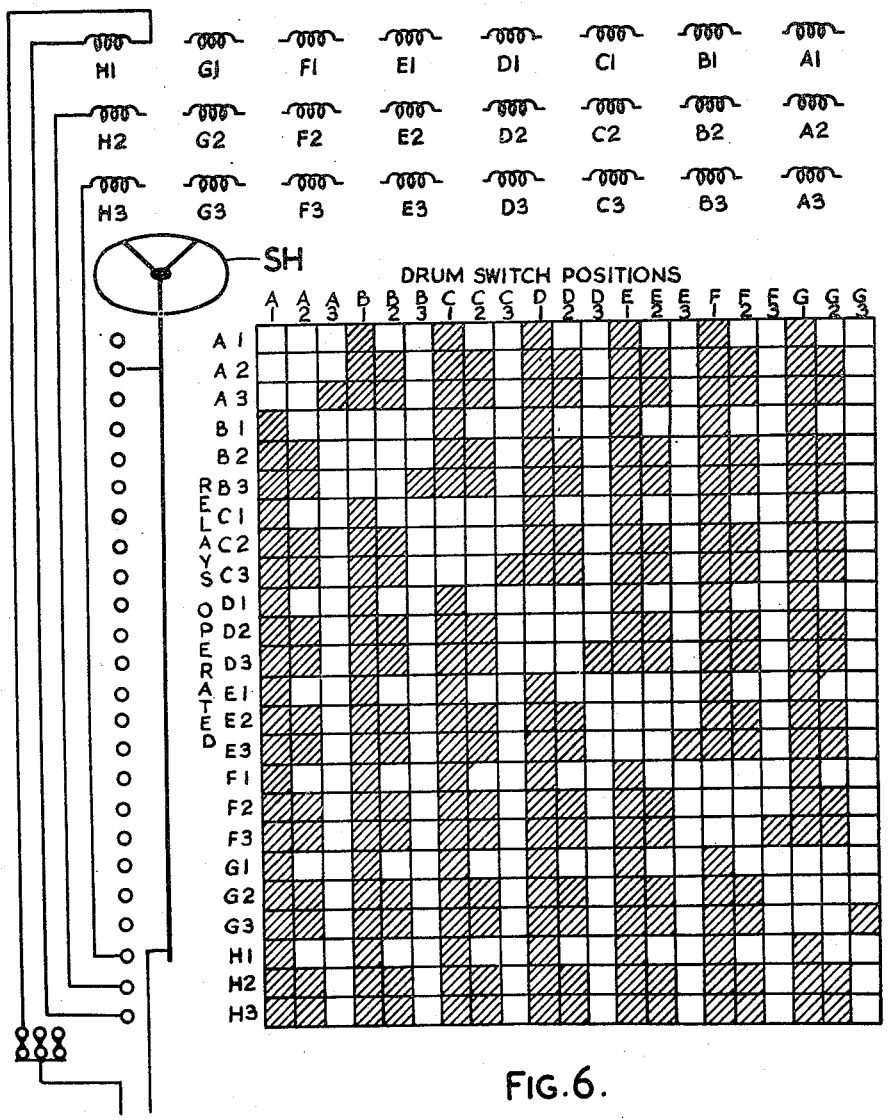
Figure 7:
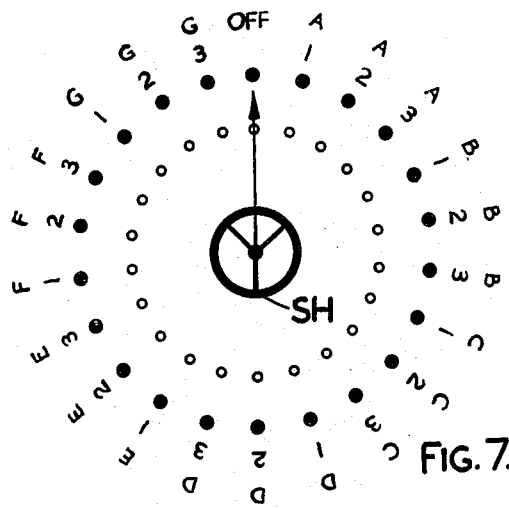
Figure 8:
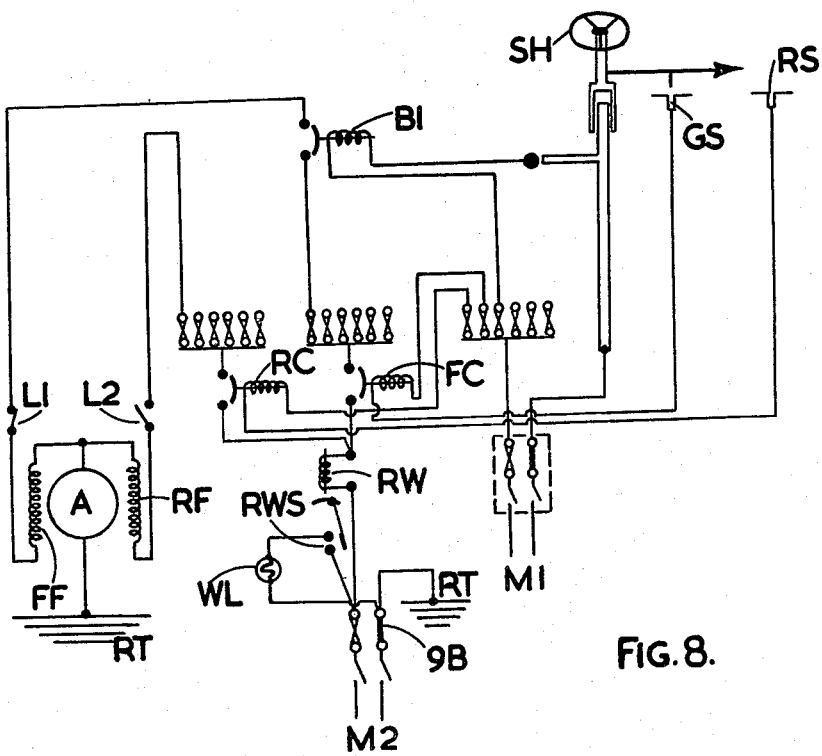

The invention is illustrated in the accompanying drawings in which Fig. 1 is a simplified schematic plan and Fig. 2 a simplified schematic elevation of one embodiment as applied to a rectangular garage with entry and exit at the same end; Fig. 3 shows in simplified plan, Fig. 4 in simplified side elevation and Fig. 5 in simplified end elevation one form of platform which may be standardised if desired; Figs. 6 and 7 are operating diagrams showing a controller scheme for platform control; and Fig. 8 is a simplified circuit diagram for the scheme of Figs. 6 and 7.

Referring to Figs. 1 and 2 these figures show a rectangular garage with entry and exit at the same end—the left hand end in Fig. 1. There are 48 parking spaces each occupied by a vehicle platform. The platforms are arranged in six rows and are designated A1 to H1, A2 to H2, A3 to H3, A5 to H5, A6 to H6 and A7 to H7 being arranged in six rows R1, R2, R3, R5, R6, R7. Between rows R3 and R5 is a longitudinal space S4. At the right hand end of the garage is an additional platform AP carrying a turntable APT. The platform AP runs on rails or in grooves APR and can be brought opposite the end of any row or opposite the end of the space S4. This platform and its turntable are intended to be controlled as desired by an operator and may be driven by an electric motor or motors controlled by a controller on the platform. In some cases the turntable or even the platform itself may be purely manually operated, i. e. arranged to be moved by hand without power driving.

The platforms in the rows are mounted on transverse rails or in grooves R. Each platform, one of which is shown separately in Figs. 3, 4 and 5 runs on rollers 1 on a shaft 2 driven by an electric motor 3 the motor having two field windings, one for rotation in one direction and the other for rotation in the other. The motor on each platform receives current through one or other of two conductors in a flexible cable 4, one conductor being energised for rotation in one direction and the other being energised for rotation in the other. Since the maximum movement of any platform is only a little more than its own width the cables 4 can conveniently come down to their respective platforms from fixed points on the ceiling thus avoiding any need for expensive or exposed trolleys or the like. The current returns from the motors are preferably made through earth—as shown through conductive rails or angle irons 5 in the floor grooves. Each platform has two spring biassed longitudinal ramps 6, one at each end, which the weight of a vehicle will force down. This has the advantage that where, as in Fig. 1, the presence of roof stanchions 8 compels the platforms to be slightly spaced, end to end, the ramps enable a vehicle to be driven along a row of platforms without having to negotiate steps which, though in any case quite shallow, might be inconvenient for a small vehicle.

Each platform is capable of moving sideways out of its row and in the direction of the space S4 by an amount equal to the distance between adjacent row centre lines. Thus, for example, if it was desired to drive out a vehicle on platform G2, platforms H2 and H3 would be moved sideways so as respectively to occupy the space marked H3 and a portion of space S4 in Fig. 1, thus leaving a clear way out. The sideways movements of the platforms are limited by limit switches (not shown in Figs. 1 to 5) actuated by the platforms themselves. Thus if the motors of H2 and H3 were energised to move these platforms into said positions in spaces H3 and S4 the two respective limit switches would be opened and the motors therefore stopped when those positions were reached. Similarly limit switches are provided to limit the return movements of the platforms.

At the end of each row and of the longitudinal space is a bar obstruction B which is interlocked with a switch in the main supply so that if any bar is removed or hinged up to give access to or from a row or the longitudinal space the current is cut off.

The mechanical construction of the platforms is capable of wide variation in practice. As shown, however, each platform has a transverse strain or tie rod 6 which slightly arches the platform proper to ensure that the weight of a vehicle is properly taken at and near the corners of the platform. Further the motors are staggered as shown in Fig. 1 to allow the rows to be close together. A vehicle is indicated in dotted lines in position on the platform in Fig. 5 only.

A suitable operating scheme for the installation of Figs. 1 and 2 is partly shown in Figs. 6 and 7 and is partly diagrammatically illustrated in Fig. 8. These figures show the controller arrangement only for one half the installation of Figs. 1 and 2; namely for the platforms in the top half of Fig. 1.

A similar controller arrangement (not shown) is provided for parking and "unparking" in the lower half of Fig. 1 and, of course, the controls for the two halves are suitably interlocked to prevent simultaneous operation.

Referring to Figs. 6 to 8 each motor has an armature A, a forward field FF and a reversing field RF and is energised through one or other of the limit switches L1, L2 when its own selecting contactor and its own forward contact FC or reversing contactor RC are operated. The selecting contactors are represented by coils, numbered in correspondence with the platforms, in Fig. 6 only a few connections being shown. Only a single selecting contactor, B1, is shown in Fig. 8. Motor circuit selection is effected by rotating a handle SH to the appropriately marked position (see Fig. 7) and then pressing it down. Rotation of handle SH actuates a drum controller the contact connections of which are conventionally represented in the squared diagram of Fig. 6 in which each cross-hatched square represents selecting contactor energisation. Thus, in position A1 the selecting contactors B1 to H3 inclusive are energised; in position A3 contactor A3 only is energised, in position D1 all except the selecting contactors D1, D2 and D3 are energised . . . and so on. The energisation circuit for a typical selecting contactor B1 is shown in Fig. 8 and extends from the mains at M1 the circuit including a switch 9B interlocked with the obstruction bars B of Fig. 1. When the handle SH has been rotated to the desired position it is pressed down thus closing at socket GS a circuit fed from the supply at M1 for the forward contactor FC. This closes and establishes a circuit from the supply at M2, through relay winding RW, contacts of FC, contacts of B1, limit switch L1, forward field FF armature A, earth or track return RT, another obstruction bar interlock switch 9B back to the supply M2. Relay winding RW closes contacts RWS and lights one or more warning lamps WL. Similar circuits (not shown) for the other selected motors are established and the selected platforms move sideways towards the longitudinal space. When they have all travelled the correct distance their limit switches L1 operate. When it is desired to return the platforms the handle is returned to the "off" position and again pressed down. This closes the circuit at socket RS and accordingly energises the winding of contactor RC. This closes and establishes a reverse direction energising circuit through L2 and RF for the motor of any platform which is not in its normal row position. The platforms accordingly return to their normal positions in which they re-open their limit switches L2. There is, of course, a socket GS for all positions of the handle SH except the off position and a socket RS is provided in the off position only. It will be noted that there are no positions H1, H2, H3 in Fig. 7. This is because, in this installation, it is considered sufficient to allow vehicles at H1, H2, H3 (and of course at H5, H6, H7) merely to back out.

It will be seen how simple the system is from the drivers' point of view. To park a vehicle it is merely driven straight down the space S4 on to platform AP, turned round on turn-table APT, and carried in platform AP to the end of whichever row it is to be parked in. The controller is then operated to move sideways out of the way whatever platforms it is necessary to move to give free access to the chosen parking space and the vehicle is then driven straight on to the desired platform. The moved platforms are then returned. To "unpark," the platforms obstructing the vehicle in rows R1, R2, R6 and R7 (in the direction in which it is now facing) are moved sideways by the "unparking" controller and the vehicle driven straight out while in rows R3 and R5 the designated itself is moved out.

The term "vehicle" as employed in this specification is intended in a wide sense to include any wheeled passenger or goods carrier and is not limited to automobiles or lorries. Thus it would include hand drawn or other trucks or wheeled platforms such as are commonly employed for moving goods in factories said trucks or the like sometimes having jacking or similar devices whereby they may be employed to pick up packages or goods from a floor or shelf on to a platform forming a sometimes detachable part of the said truck or the like. Similarly the expression "parking arrangement for a garage parking place or the like" is by no means limited to refer only to parking spaces for motor vehicles but extends to all parking or storing spaces such as goods warehouses and stores. Thus the invention could often be applied with advantage to storage warehouses to allow goods to be taken to and removed from predetermined places in the warehouse by means, for example, of wheeled trucks with detachable goods carrying platforms.

The invention is not, of course, limited to the particular arrangements shown and described for many modifications are obviously possible.

What I claim is:

In a parking arrangement a plurality of movable vehicle carrying platforms each adapted to carry one vehicle and each fitted with its own driving electric motor arranged end to end in a plurality of similar rows, the platforms in a row having their ends adjacent to provide a vehicle path from one platform to the next, a longitudinal space alongside at least one of said rows and there being at least two of said rows on at least one side of said longitudinal space, of length substantially equal to the length of a row and of width at least equal to the width of a row, means providing a transverse path for each movable platform, sideways out of its row at least into the adjacent row on the side thereof towards said longitudinal space, the electric motor on each platform being arranged to drive such platform back or forth along its transverse path, an electric power supply circuit to all said motors and switch controller means for selecting any desired combination of said motors for simultaneous energisation from said supply circuit to operate the selected motors and move the selected platforms at will out along their transverse paths and back again, vehicle entrance and exit being provided at the same end of all of the rows, there being provided at the opposite end of all of the rows an additional vehicle carrying movable platform fitted with a turntable and movable transversely across said opposite ends and adapted to be stopped opposite the end of any row or of the longitudinal space.

KENNETH RONALD MEDWAY.

REFERENCES CITED

The following references are of record in the file of this patent:

UNITED STATES PATENTS

| Number | Name | Date |
|---|---|---|
| 1,574,822 | Koch | Mar. 2, 1926 |
| 1,643,409 | Freeman | Sept. 27, 1927 |
| 1,816,685 | Lowenstein | July 28, 1931 |
| 1,829,023 | Swartout | Oct. 27, 1931 |
| 1,860,008 | Bell | May 24, 1932 |
| 2,013,482 | Taylor | Sept. 3, 1935 |